United States Patent [19]

Jensen

[11] Patent Number: 4,849,959
[45] Date of Patent: Jul. 18, 1989

[54] SPLIT DISK CARRIER WITH LOCKING MECHANISM

[75] Inventor: Thomas D. Jensen, Himrod, N.Y.

[73] Assignee: Eastman Kodak Company, Rochester, N.Y.

[21] Appl. No.: 208,209

[22] Filed: Jun. 16, 1988

[51] Int. Cl.$^4$ .................. G11B 25/04; B65D 85/02
[52] U.S. Cl. .................................. 369/291; 206/309; 206/444; 360/133; 369/77.2
[58] Field of Search .................. 369/291, 77.2, 292; 360/133; 206/309, 312, 316, 444

[56] References Cited

U.S. PATENT DOCUMENTS

| | | | |
|---|---|---|---|
| 4,608,681 | 8/1986 | Shiosaki | 369/77.2 |
| 4,773,058 | 9/1988 | Petruchik et al. | 369/77.2 |
| 4,773,061 | 9/1988 | Stark et al. | 369/77.2 |

Primary Examiner—Steven L. Stephan
Attorney, Agent, or Firm—Warren W. Kurz

[57] ABSTRACT

A carrier for releasably retaining a data storage disk comprises a pair of frame members which cooperate to define a generally circular aperture for receiving a data storage disk. The frame members are slidably coupled so as to vary the size of the aperture. The aperture-defining walls of the frame members are provided with a disk-holding means adapted to engage and support the peripheral region of a data storage disk. The frame members are resiliently urged together so that they take a position in which the disk-holding means engage and support a data storage disk positioned in the aperture. A locking mechanism is provided for releasably locking the frame members in the aforesaid position.

9 Claims, 5 Drawing Sheets

SPLIT DISK CARRIER WITH LOCKING MECHANISM

BACKGROUND OF THE INVENTION

This invention relates to the field of data storage and, more particularly, to improvements in apparatus for facilitating the handling and transport of data storage disk, e.g., optical and magnetic hard disks.

The desirability of handling high density data storage disks without contacting their delicate data recording surfaces is manifest. To facilitate the transport of a data storage disk without contacting the data recording surfaces thereof, it is known to dispose the disk in a so-called "disk carrier". Such a device typically comprises a rigid, planar frame, usually rectangular in shape, having a circular therein slightly larger in diameter than the disk diameter. The disk is supported within the circular aperture by a plurality of spring-biased latches which engage the disk at different points along the disk periphery. Prior to use in a disk player/recorder, the disk is released from the carrier by disk-releasing means associated with the disk player/recorder.

In the commonly assigned U.S. Application Ser. No. 923,509 filed on Oct. 27, 1986 in the names of D. J. Stark et al, there is disclosed a disk carrier of the type mentioned above. The carrier frame is composed of several parts which are rigidly coupled to define a generally circular aperture of fixed diameter slightly larger than the data storage disk. The disk is supported within such aperture by a plurality of small tabs which support a disk from both sides over an arc length of about 10° or less, and a pair of movably mounted latches, each supporting the disk at two other locations equally spaced around the disk periphery. Each of the movable latches is spring-biased toward engagement with the disk periphery and each serves to support the disk over an arc length of a few degrees. Prior to use, disk-releasing means associated with the disk player/recorder serves to urge the movable latches away from the disk periphery. By the arrangement disclosed, a disk may be released from the carrier without substantially displacing the disk relative to its intended axis of rotation.

Disk carriers of the above type are advantageous from the standpoint that a relatively small displacement of the movable latches from the disk periphery can readily effect release of the disk from the carrier. However, such carriers may be viewed as disadvantageous from the standpoint that, under certain conditions, they may release a disk prematurely. In order to solve this problem, an improved carrier has been developed. Such carrier is a subject of the commonly assigned U.S. application Ser. No. 208,190 filed on the same day of this application in the names of Roger G. Covington et al. Such carrier comprises two frame members biased towards each other by spring means so that the frame members themselves, rather than small movable latches, releasably hold a data storage disk. By this carrier, the possibility of premature release of a disk is considerably lowered. However, even with such improved carrier, there remains a slight chance of premature release of the disk when the carrier is subjected to a sudden impulse or a shock, or when a strong force is inadvertently applied to the carrier which tends to pull one frame member from the other. Also, even if the carrier frame members are not sufficiently separated to effect disk release any displacement of the frame members from their nominal positions will act to change the relationship between two racks of transport teeth located along the respective lateral edges of the frame members. Such teeth are designed to be engaged by a toothed conveyor mechanism in an automated disk library. This shifting of the racks will produce an undesired skewing of the carrier and eventually result in a jamming of the carrier in the transport mechanism.

SUMMARY OF THE INVENTION

In view of the foregoing, an object of this invention is to provide an improved carrier for a data storage disk, which carrier has practically no possibility of prematurely releasing a disk even when a strong force is applied thereto.

The carrier of the invention comprises a pair of frame members which cooperate to define a generally circular aperture for receiving the disk. The frame members are adapted to be slidably coupled to each other to vary the size of the circular aperture. This circular aperture is defined, at least in part, by an arcuate surface on each of the frame members. Disk-holding means are formed on the arcuate surfaces and adapted to engage and support the peripheral region of the disk. The frames are urged together by urging means so that the frames take a first position wherein the holding means engage the peripheral region of the disk. In this first position, the frame members are selectively locked together by a locking mechanism which prevents the frame members from sliding apart. Preferably operation of the locking mechanism is controlled by the disk-releasing mechanism of a disk drive unit, as it functions to release a disk by moving the carrier frame members apart from each other to a second position wherein the disk-holding means are free from the disk.

The invention and its advantages will be better understood from the ensuing detailed description of a preferred embodiment, reference being made to the accompanying drawings.

DETAILED DESCRIPTION OF THE PREFERRED EMBODIMENTS

Figure 1:
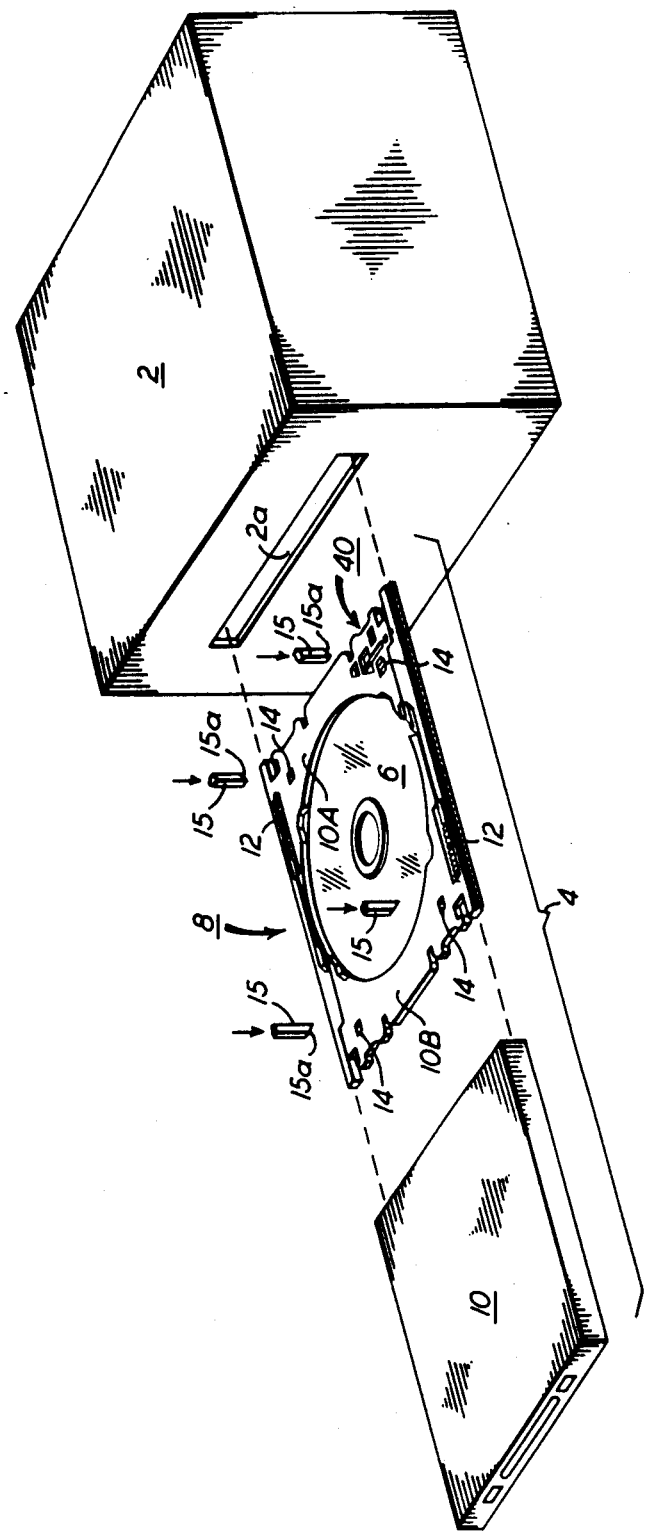
FIG. 1 is a perspective illustration of a data recording playback system.

Referring now to the drawings, FIG. 1 illustrates a data recording/playback system comprising a disk drive unit 2 and a data storage disk assembly 4. The latter basically comprises a rigid data storage disk 6, a disk carrier 8 and a protective cartridge 10. As explained below, disk carrier 8 serves to releasably capture disk 6 so that the disk is accurately and securely registered within the carrier structure, yet is capable of being readily removed from the carrier for rotation in a plane spaced from the carrier. When not in use, the carrier and its captured disk are positioned within the protective cartridge, the later being sufficiently rigid to guard against contact with the disk's recording surfaces. In use, the carrier-loaded cartridge is inserted into the disk drive unit through a slot 2a. Upon entering the disk drive unit, a mechanism within serves to extract the disk carrier from the cartridge and to return the cartridges to the user. The disk drive unit also includes an apparatus for releasing the disk from its carrier and for loading the disk onto a drive spindle assembly for rotation. Such an apparatus is disclosed, for example, in the commonly assigned U.S. Application Ser. No. 923,508, filed Oct. 27, 1986 in the name of Dwight Petruchik, et al.

Figure 2A:
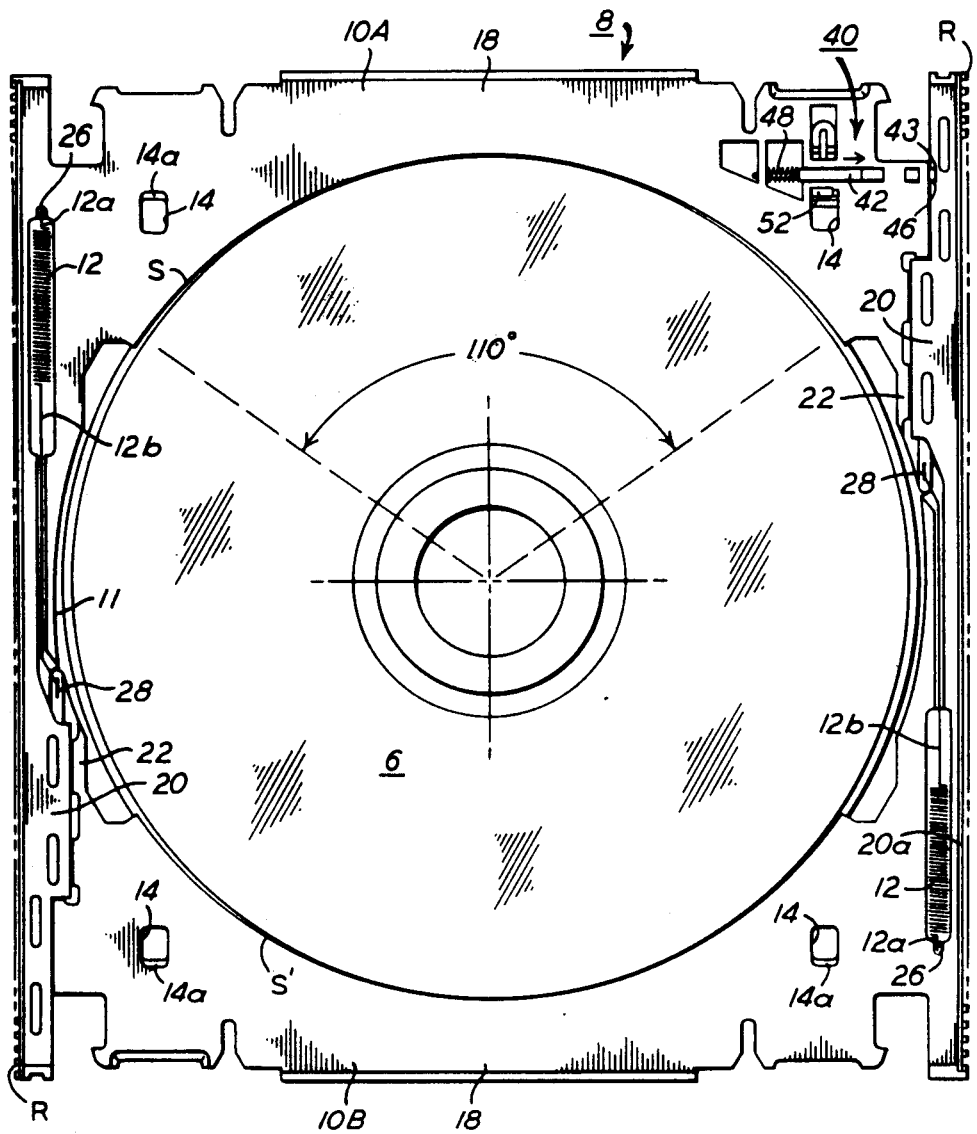
FIGS. 2A and 2B are top views of a preferred disk carrier showing the components in disk-retaining and disk-releasing positions, respectively.
Figure 2B:
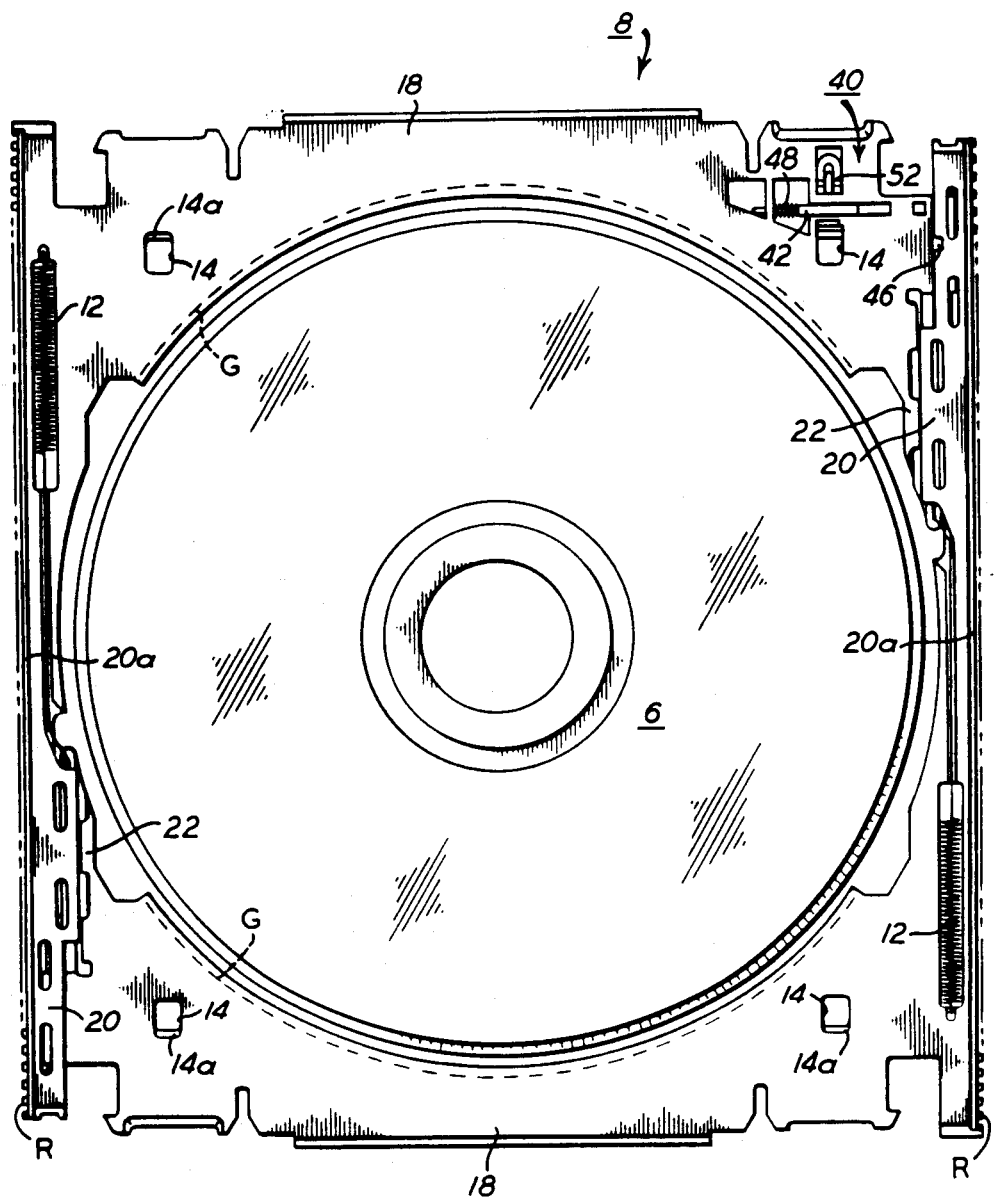

Referring to FIGS. 2A and 2B, disk carrier 8 basically comprises a pair of crescent-shaped frame members 10A, 10B having arcuate surfaces S, S', respectively, which cooperate to define a generally circular aperture 11 for receiving a data storage disk 6. The crescent-shaped frame members are slidably connected by a tongue groove arrangement so that the size of the circular aperture can be varied, whereby a data storage disk can be captured within the aperture when the frame members are relatively close together, as shown in FIG. 2A, and released from the aperture when the frame members are relatively far apart, as shown in FIG. 2B. Spring means, preferably in the form of a pair of coil springs 12,, serve to resiliently urge the frame members toward each other, i.e., toward disk-capturing positions. Preferably, each frame member is provided with structure which facilitates movement of the frame members apart to enable release of the disk for use. Such structure may comprise, for example, a plurality of rectangular apertures 14, each having a bevelled edge 14a which is adapted to be engaged by a like plurality of tapered release pins 15, shown in FIG. 1. The interaction of such release pins and apertures to effect disk release is fully described in the aforementioned Petruchik et al patent application. Briefly, however, downward movement of the release pins into apertures 14 causes cam surfaces 15a to engage the bevelled edges 14a of apertures 14. As the release pins move through these apertures, cam surfaces 15a exert lateral forces on the frame members, thereby tending to move such members apart against the biasing forces provided by springs 12. Disk-holding means are provided on the arcuate surfaces S, S' for engaging and supporting the peripheral region of the disk 6. As best shown in FIG. 2B, such disk-holding means comprises a pair of elongated grooves G formed in arcuate surfaces S, S'. Each of the grooves is shaped and dimensioned to support a disk at its periphery over an arc length of at least 50°, and preferably over an arc length of about 110°, as shown. Such an elongated groove is desirable since it holds the disk with high reliability and lends rigidity to the disk/carrier assembly.

It is preferred that frame members 10A and 10B have identical shapes, each comprising a crescent-shaped portion 18 and a pair of coupling legs 20 and 22 at opposite ends of such portion. As is apparent, coupling leg 20 is substantially longer than leg 22 and the outside edge 20A of leg 20 defines one of the lateral edges of the carrier. Preferably, each edge 20A is provided with a rack of teeth R which extends along its entire length. Rack R is designed to cooperate with a toothed conveyer mechanism to advance the carrier in a disk utilization device. Such a conveyer mechanism is disclosed in the commonly assigned U.S. Application Ser. No. 019,903 filed on Feb. 27, 1987 in the name of Dect et al, and entitled "Automatic Disk Library". Each of the coupling legs is provided with a tongue and groove structure which enables leg 22 to be slidably received in leg 20 so that the frame members 10A and 10B are slidably coupled to produce the carrier assembly shown in FIGS. 2A and 2B. A particular arrangement of such tongue and groove structure is disclosed in the aforementioned commonly assigned U.S. application Ser. No. 208,190 filed on the same day of this application in the names of Roger G. Covington.

In addition, to the aforementioned tongue and groove structure, coupling legs 20 and 22 are provided with reference surfaces 30 and 32, respectively. As shown in FIG. 2A, these reference surfaces only abut each other when no disk is present (or when the disk tolerances are minimum). Normally, when a disk is present, the disk will determine the relative positions of the frame members, and reference surfaces 30, 32 will be slightly spaced apart.

As noted above, springs 12 serve to urge the frame members 10A and 10B together. When the two frame members are slidably coupled, one end 12a of each spring 12 is connected to a small aperture 26 formed in leg 20 and the opposite end 12B of the spring is connected to a small slot 28 formed near one end of leg 22.

To prevent frame members 10A and 10B from separating prematurely and thereby releasing a disk at an inopportune time, a locking mechanism 40 is provided. Such locking mechanism serves to releasably lock frame members 10A and 10B in a first position wherein the grooves G engage the peripheral region of a disk located in the carrier aperture 11. Although the drawings show only one such locking mechanism, i.e. the locking mechanism arranged in the upper right corner of the carrier shown in FIG. 2A, the preferred embodiment includes another identical locking mechanism which is arranged in the lower left corner. The second locking mechanism is not shown to simplify the drawings. It will be appreciated, however, that the use of two locking mechanisms is not essential to the invention and one locking mechanism is able to achieve the object of the invention.

Figure 3A:
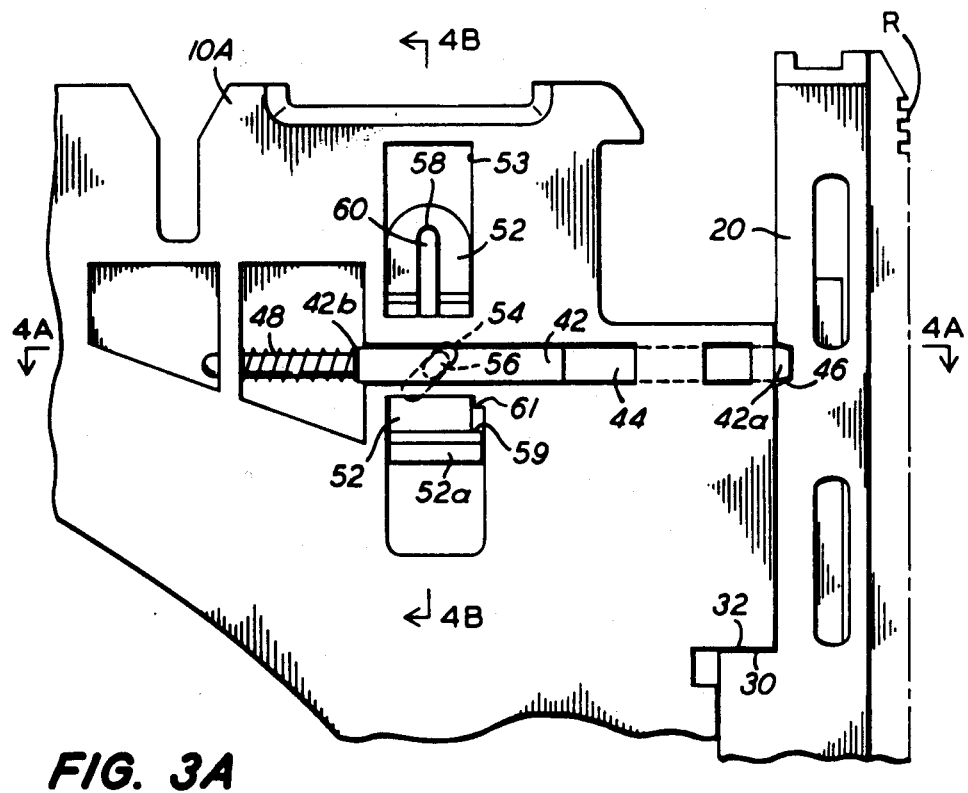
FIGS. 3A and 3B are enlarged plan views of a portion of the disk carrier shown in FIGS. 2A and 2B, respectively.
Figure 4B:
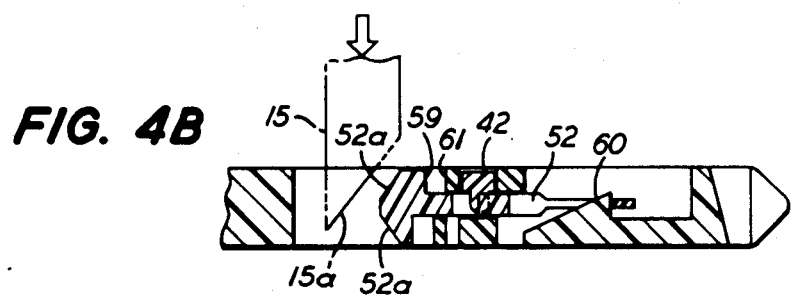
FIG. 4B is a cross-sectional view taken along the line 4B—4B in FIG. 3B.
Figure 4A:
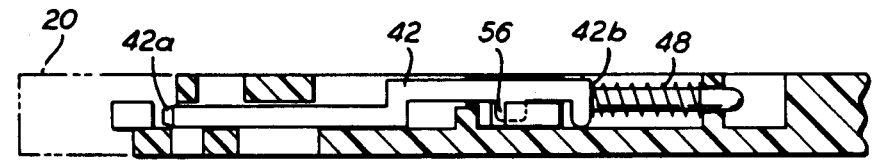
FIG. 4A is a cross-sectional view taken along the line 4A—4A in FIG. 3A.
Figure 3B:
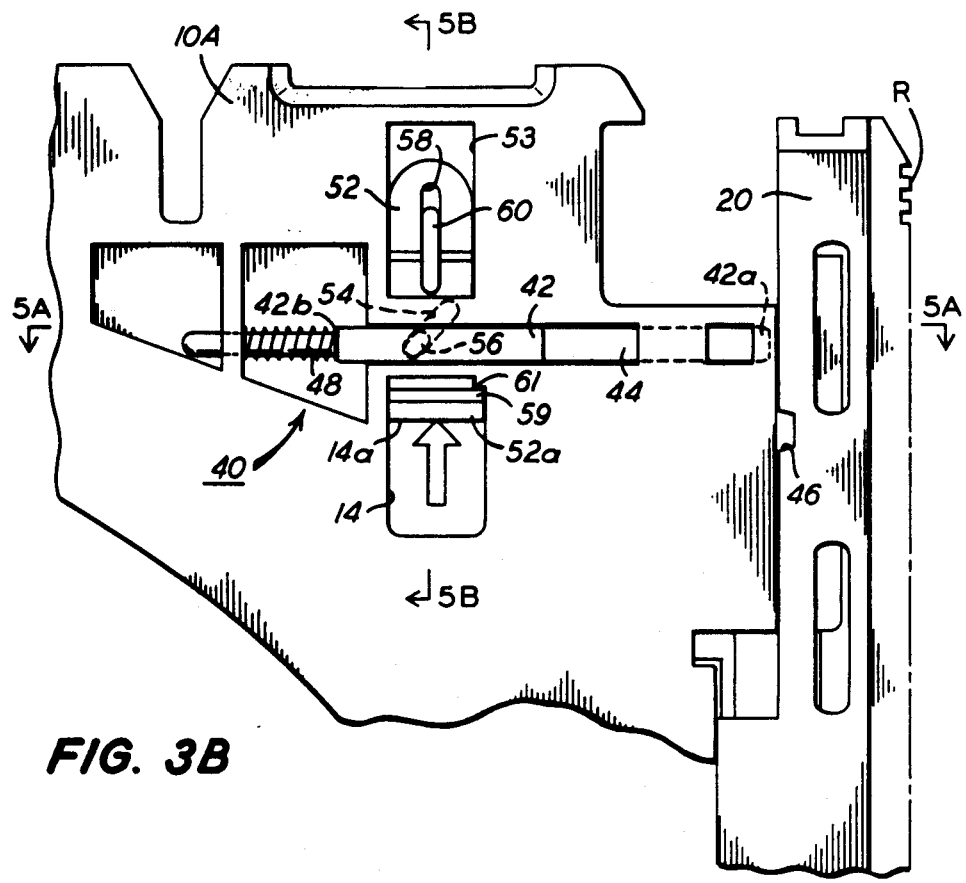

As shown in FIG. 3A, locking mechanism 40 comprises a lock bar 42 which is slidably received in a guide passage 44 formed in the frame member 10A. Passage 44 extends in a direction transverse to the longitudinal direction of leg 20 of the other frame member 10B. Such leg 20 is provided with a notch 46 which is adapted to receive one end 42a of the lock bar when the frame members are in the disk-capturing position shown in FIG. 2A. The lock bar is biased towards engagement with notch 46 by a compression spring 48 which is situated between a shoulder 42b on the lock bar and a wall portion of the frame member 10A. Movement of the lock bar in passage 44 is controlled by a slider member 52 which is slidably mounted in an elongated recess 53 formed in the carrier frame. Recess 53 extends substantially perpendicular to the lock bar. The slider member has a slot 54 which is slanted at about 45° relative to the lock bar. Slot 54 accommodates a pin 56 (shown in FIGS. 4A and 5A) which extends outwardly from the lock bar. The slider member 52 includes another slot 58 which is adapted to receive a stop member 60 which extends upwardly from the base of recess 53. Stop member 60 functions to determine the innermost position of the slider member, as well as to guide the slider member to assure the linear movement thereof.

Figure 5B:
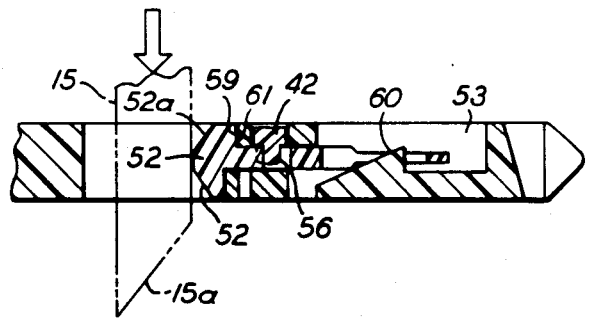
FIG. 5B is a cross-sectional view taken along the line 5B—5B in FIG. 3B.
Figure 5A:
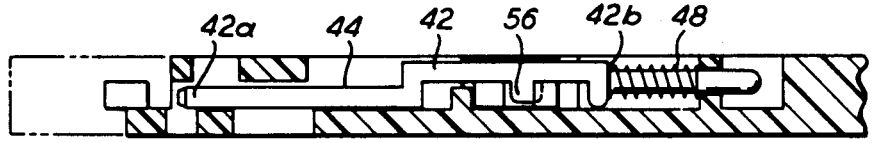
FIG. 5A is a cross-sectional view taken along the line 5A—5A in FIG. 3A.

As noted above, the disk-releasing means of the disk drive unit includes four release pin 15, one of which pins being shown in FIG. 5A. To release a disk, pin 15 is moved in a direction normal to the plane of the carrier. When so moved, the pin's cam surface 15a enters carrier aperture 14 and engaged the inner end of the slider member. In order to facilitate the camming action provided by cam surface 15a, the inner end of the slider member is provided with opposing bevelled edges 15a which enable the slider to be cammed by the release pin from either side of the carrier. The inner end portion of the slider member also has a tab 59 which, as explained below is adapted to engage a shoulder 61 formed in the side wall of recess 53. As will be appreciated from FIG. 3A, the inner end portion of the slider defines the aforementioned bevelled edge 14a of the aperture 14.

The components of the carrier take the position shown in FIG. 3A when the carrier is inserted in the disk drive unit. The disk-releasing means of the disk drive is actuated to lower the release pins 15 so that the cam surface 15a engages the bevelled edge of the slider member to move the slider member outwardly. This movement causes the lock bar to move against the force exerted by the spring 48 due to the caming action between the slanted slot 54 and the pin 56. As the lock bar moves against the spring force, its end 42a becomes disengaged from notch 46 formed in leg 20. In this condition, the frame members 10A and 10B are unlocked from each other but kept in the first position due to the effect of the springs 12. Further movement of the release pin 15 causes the slider member 52 to further move until its tab 59 abuts the shoulder 61. The continued downward movement of the release pin 15 urges the frame members 10A and 10B apart, against the biasing force provided by the springs 12.

It will be appreciated that in the apertures 14 in the upper left corner and lower right corner as viewed in FIG. 2A, the bevelled edges 14A are integrally formed with the frame members. These edges are so positioned that their associated release pins 15 engage them when the tabs 59 of the sliders abut shoulders 61.

From the foregoing, it will be understood that downward movement of the release pins 15 first releases the locking mechanisms and thereafter moves both frame members apart from the center of the disk 6, allowing grooves G to disengage from the disk. After the disk is used in the disk drive unit 2, the release pins 15 are removed from aperatures 14, thereby allowing springs 12 to pull the frame members together until the grooves G hold the disk. In this condition, lock bar 42 again aligns with notch 46, spring 48 urges its operative end 42a into engagement therewith.

The invention has been described in detail with particular reference to certain preferred embodiments thereof, but it will be understood that variations and modifications can be effected within the spirit and scope of the invention.

What is claimed is:

1. A carrier for releasably retaining a data storage disk and adapted to release the disk when actuated by disk-releasing means of a disk drive unit, said carrier comprising:
   (a) a pair of frame members which cooperate to define a generally circular aperture for receiving a data storage disk, said frame members being slidably coupled to vary the size of said circular aperture, said circular aperture being defined, at least in part, by an arcuate surface on each of said frame members;
   (b) disk-holding means provided on said arcuate surfaces and adapted to engage and support the peripheral region of a disk positioned in said aperture;
   (c) means for urging said frame members together so that the frame members take a first position in which said disk-holding means engage and support the peripheral region of a disk; and
   (d) a locking mechanism for selectively locking said frame members in said first position, said locking mechanism comprising means cooperable with the disk-releasing means of the disk drive unit to unlock said locking mechanism and thereby allow said frame members to move apart from each other to a second position wherein said holding means are free from said disk, and further having cam means that cooperate with the disk releasing means to cam the frame members apart after they have been unlocked.

2. A carrier according to claim 1, wherein each of said frame members includes a pair of legs, said legs of one frame member being adapted to slidably coupled to the legs of the other frame member, and said locking mechanism comprises a notch formed in one of the legs of one frame member, and a lock bar mounted on the other frame member for reciprocal movement toward and away from engagement with said notch.

3. A carrier according to claim 2 further including a spring for biasing said lock bar toward said notch.

4. A carrier according to claim 2, wherein said locking mechanism further comprises a slider member mounted on said other frame member for sliding movement in a direction generally transverse to the direction of reciprocal movement of said lock bar, said slider member having a slot for receiving a pin formed on said lock bar, said slot being arranged so that movement of the slider member, in one direction causes said lock bar to move away from said notch, and wherein the disk-releasing means of the disk drive unit includes a release pin having at one end thereof a cam surface which is adapted to move said slider member in said one direction when the pin is moved toward the disk carrier to effect disk release.

5. A carrier according to claim 4, wherein said other frame member has an aperture formed therein, one side of said aperture being defined by a part of said slider member, said aperture being so positioned that the release pin is insertable therein.

6. A carrier according to claim 5, wherein said part of the slider member is a bevelled edge.

7. A carrier according to claim 5, wherein said frame member has a portion which abuts a part of said slider member after said slider member reaches a position to withdraw said lock bar from said notch so that further movement of said slider member acts to move said one frame member relative to the other frame member.

8. A carrier according to claim 1 wherein said frame members are identical and have identical locking mechanisms.

9. A carrier according to claim 8, wherein said frame members respectively further include other apertures having fixed edges which are engageable with cam surfaces of other release pins of the disk drive unit.

* * * * *